(12) United States Patent
Bolton et al.

(10) Patent No.: US 11,358,302 B1
(45) Date of Patent: Jun. 14, 2022

(54) MULCH COLORING

(71) Applicant: T.H. Glennon Company, Inc., Salisbury, MA (US)

(72) Inventors: Christopher Bolton, Mertzown, PA (US); Derek Lindsey, Woodruff, SC (US); Steve DiMascio, Coatesville, PA (US); Westley Koller, Leesport, PA (US)

(73) Assignee: T.H. GLENNON COMPANY, INC., Salisbury, MA (US)

( * ) Notice: Subject to any disclaimer, the term of this patent is extended or adjusted under 35 U.S.C. 154(b) by 0 days.

(21) Appl. No.: 17/218,865

(22) Filed: Mar. 31, 2021

(51) Int. Cl.
*B05D 7/06* (2006.01)
*B27K 5/02* (2006.01)
*B05D 1/00* (2006.01)

(52) U.S. Cl.
CPC ............... *B27K 5/02* (2013.01); *B05D 1/002* (2013.01); *B05D 7/06* (2013.01)

(58) Field of Classification Search
None
See application file for complete search history.

(56) References Cited

U.S. PATENT DOCUMENTS

| | | | | |
|---|---|---|---|---|
| 3,659,700 | A * | 5/1972 | Tunderman | B65G 33/24 198/635 |
| 5,358,738 | A * | 10/1994 | Sawka | B05B 13/0257 427/220 |
| 2004/0170759 | A1* | 9/2004 | Bardos | B27N 1/00 427/212 |

OTHER PUBLICATIONS

Anonymous, "UT-4 Utility Auger", AGI Westfield, Feb. 18, 2021, pp. 1-3.
Anonymous, "SEW Eurodrive MOVITRAC® LT Nomenclature", MOVITRAC® LT Frequency Inverter—Specifications and Price List, Feb. 2020, pp. 1-3.
Anonymous, "Mulch Color Jet: The Mulch Color Jet #1 Compact Coloring Unit", T.H. Glennon Company Inc., http://www.mulchcolorjet.com/mulch-coloring-machine. Mar. 2021, pp. 1-4.
Anonymous, "Poly Dome Agricultural Products 2007", Poly Dome Catalogue, 6th Edition, http://polydome.com/. Jan. 2007, pp. 3-36.

* cited by examiner

*Primary Examiner* — Alexander M Weddle
(74) *Attorney, Agent, or Firm* — Tutunjian & Bitetto, P.C.

(57) ABSTRACT

Coloring systems and methods include a conveyor that transports a material. An auger is configured to move a colorant from a reservoir to the conveyor. A grinder receives the material and the colorant from the conveyor and grinds the material and the colorant together to produce a colored material.

5 Claims, 3 Drawing Sheets

MULCH COLORING

BACKGROUND OF THE INVENTION

The present invention relates to systems and methods for coloring mulch products, and, more particularly, to systems and methods that use a screw conveyor to transport mulch colorant from a tank to a mulch conveyor.

Mulch is a material with many applications, for example inhibiting weed growth, conserving soil moisture, and landscaping aesthetics. Mulch is often formed from an organic material, such as wood chips. For wood mulches in particular, while the natural color of the wood may be desirable for some applications, other colors may be desirable.

BRIEF SUMMARY OF THE INVENTION

A coloring system includes a conveyor that transports a material. An auger is configured to move a colorant from a reservoir to the conveyor. A grinder receives the material and the colorant from the conveyor and grinds the material and the colorant together to produce a colored material.

A mulch coloring system includes a reservoir that holds a powdered colorant. A conveyor transports a coarse mulch material. An auger has a solid-core shaft, configured to move the powdered colorant from the reservoir to the conveyor. A water source adds water to the coarse mulch material on the conveyor. A grinder receives the coarse mulch material, the powdered colorant, and the water from the conveyor and grinds the coarse mulch material and the powdered colorant together to produce a colored mulch.

A method for coloring mulch includes transporting mulch material to a grinder using a conveyor. Powdered colorant is added to the mulch material, on the conveyor, using an auger. The mulch material and the powdered colorant are ground together in the grinder to produce a colored mulch.

These and other features and advantages will become apparent from the following detailed description of illustrative embodiments thereof, which is to be read in connection with the accompanying drawings.

BRIEF DESCRIPTION OF THE DRAWINGS

The disclosure will provide details in the following description of preferred embodiments with reference to the following figures wherein.

DETAILED DESCRIPTION

Mulch material, such as wood chips, may be colored to any of a variety of colors before it is used, making it possible to use mulch as a decorative landscaping option. Any appropriate colorant may be used, such as a liquid or powdered colorant, but applying the colorant to the mulch can be challenging. Powdered colorant, in particular, may be difficult to apply evenly. However, powdered colorant can be used even when low temperatures would cause a liquid-based colorant to freeze. Additionally, wet wood can be difficult to use with liquid colorants, for example if the mulch material has been exposed to the rain, in which case a powdered colorant can be more effective. For similar reasons, powdered colorants are easier to store in cold conditions, because they do not freeze and so do not need to be kept warm.

A screw conveyor may be employed to efficiently move powdered colorant, from a tank or dispenser to a conveyor belt that transports mulch material. The screw conveyor may be used to apply the powdered colorant at a consistent rate to the passing material, ensuring the correct ratio of colorant to mulch. This can be performed as the mulch material passes to a grinder, where the material will be ground to an appropriate size and, at the same time, will be mixed with the powered colorant, thereby producing colored mulch with any desired granularity and color.

The drawings herein are shown for the sake of illustration, and should not be construed as limiting. For example, the sizes, relative proportions, and relative positioning of the illustrated elements is selected to convey concepts relating to embodiments of the present invention—these embodiments, and others, may be implemented within the scope of the present principles.

Figure 1:
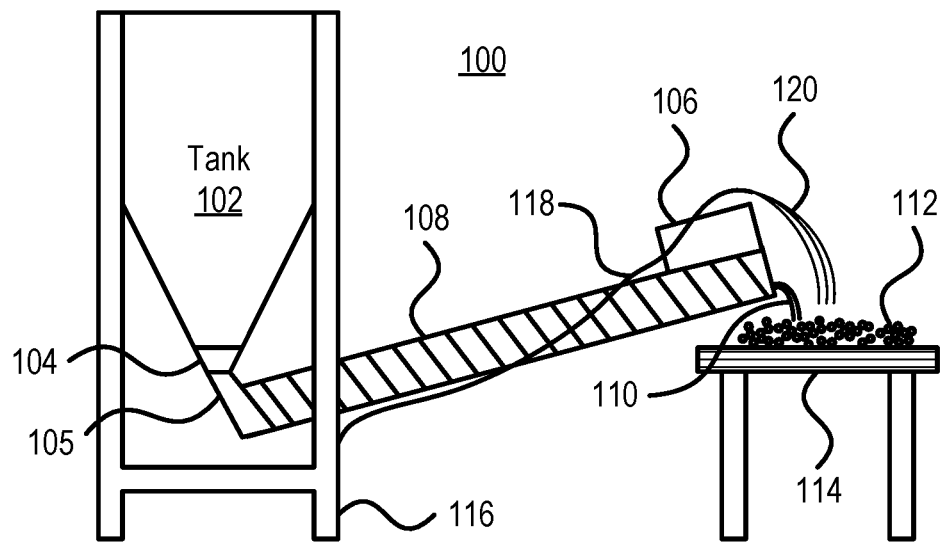
FIG. 1 is a view of a coloring system that uses an augur to transport powdered colorant from a reservoir tank to a conveyor, in accordance with an embodiment of the present invention.

Referring now to FIG. 1, an exemplary colorant system 100 is shown. A tank 102 holds any appropriate quantity of powdered colorant. In one specific and non-limiting example, the tank 102 may hold 2000 lbs of powdered colorant and may have a volume of 75 cubic feet. Such a tank may have a height of 9'6" and a diameter of 74". In another specific and non-limiting example, the tank 102 may hold 3000 lbs of powdered colorant and may have a volume of 130 cubic feet. Such a tank may have a height of 11'5" and a diameter of 74". The tank 102 may have sloped walls that taper to a nozzle 104, to funnel the powdered colorant inside the tank 102 to a feed point. The tank 102 may be mounted to a frame 116, which has sufficient strength to hold the tank 102 at full capacity. The frame 116 may furthermore have a base that can accommodate a forklift, making it possible to move the tank 102 to any needed location.

A screw conveyor may include an inlet 105, a motor 106, and an auger 108 in a housing. As powdered colorant 110 pours from the nozzle 104 and into the inlet 105, the colorant meets the spiral blade of the auger 108. The auger 108 is turned in place by the motor 106. As the auger 108 turns within its housing, colorant 110 is moved along the length of the auger 108. When the colorant 110 reaches the end of the auger 108, it pours onto mulch material 112. The mulch material 112 is carried on a conveyor 114. The nozzle 104 may include a shutoff valve, to stop powdered colorant from pouring into the inlet 105, for example while the auger 108 is being adjusted or serviced.

The mulch material 112 may include any appropriate material, at any degree of granularity. For example, the mulch material 112 may include waste wood from construction, fallen branches, trees, or any other appropriate organic or inorganic material. The mulch material 112 may include large pieces, representing material of a coarse granularity, or may include relatively small pieces, representing material of a fine granularity.

The colorant may be any appropriate powdered colorant, such as carbon black and iron oxide materials. Due to the density of the powdered colorant 110, it may be preferable to use an auger 108 with a solid central core, rather than a hollow core. Additionally, the motor 106 may need to have a relatively high power output. In one specific and non-limiting example, the auger 108 may have a 4" diameter and a length of 11', and may use a synchronous belt drive motor 106 having a power of 2 hp and a 4× variable frequency rive. The motor 106 may have an adjustable speed, which controls a rate at which the powdered colorant 110 is moved from the tank 102 to the mulch material 112. In one specific and non-limiting example, the auger 108 may move between 6 and 60 lbs of powdered colorant 110 per minute.

A water supply may also be introduced, with a hose 118 that transports water 120 to the conveyor 114. The hose 118 may include any appropriate nozzle to evenly apply water to the passing mulch material. Water 120 may be transported separately from the powdered colorant 110 to prevent the powdered colorant 110 from clumping and clogging the auger 108. The water supply may include a control value (not shown), which may include a globe valve that can be operated by hand. The hose 118 may be routed through a water flow gauge before continuing to a dispensing nozzle. The dispensing nozzle may be positioned to add water to the mulch material 112 before or after the powdered colorant 110 is added, and may provide a variety of dispensing patterns to control wetting and dust control for different sizes of the conveyor 114.

As noted above, the speed of the motor 106 and the conveyor 114 may be controlled to control the speed at which mulch material 112 moves past the auger 108, as well as the speed at which powdered colorant 110 is dispensed from the auger 108. The speed of each may be selected to apply specific amount of powdered colorant 110 per volume or weight of mulch material 112, thereby setting the correct ratio of each for a particular colorant and a particular mulch material 112. The motor 106 may furthermore include a remote control, for example using a radio transceiver or corded control interface. In this manner, the motor 106 can be remotely turned on and off, for example while an operator controls the speed of the conveyor 114. In this way, the operator can conveniently operate the entire system 100 form a single location.

The angle between the auger 108 and the ground may be adjustable, for example by a hinge at the inlet 105. The auger 108 may thereby be set to any appropriate height for the conveyor 114 that is being used. For a conveyor 114 that lifts the mulch material 112 to the inlet of a grinder, the height of the auger 108 may be set to any appropriate height along the length of the conveyor 114. The adjustment of the angle may be made automatic with the inclusion of a second motor (not shown).

Figure 2:
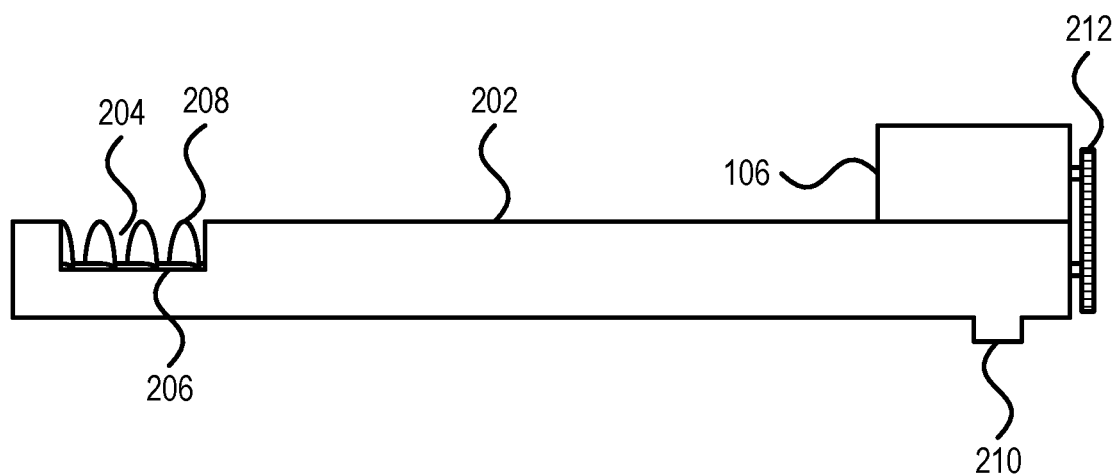
FIG. 2 is a view of an augur that can be used to transport powdered colorant from a reservoir tank to a conveyor, in accordance with an embodiment of the present invention.

Referring now to FIG. 2, additional detail is provided on the auger 108 and the motor 106. The auger 108 includes a housing 202 that has a top opening 204 to allow powdered colorant to enter, and a bottom opening 210 to allow the powdered colorant to fall out, after it has traveled the length of the auger 108. The auger 108 operates by the rotation of a screw, which includes a shaft 206 and a blade 208, where the blade 208 spirals around the shaft 206. As noted above, it is specifically contemplated that the high density of powdered colorant may call for a shaft 206 that has a solid core, rather than a hollow core, to prevent flexing, but it should be understood that hollow-core shafts are also contemplated.

The motor 106 operates the screw, for example, by a belt 212 that rotates one end of the shaft 206. As the shaft 206 turns within the housing 202, the blade 208 rotates and moves the powdered colorant through the length of the housing 202, until it reaches the bottom opening 210. The motor 106 may operate at any appropriate speed. Additionally, the belt 212 may be exchanged for a belt of a different length, along with changing the diameter of the rotor of the motor 106, to change the amount of torque and speed that are applied to the shaft 206. In this manner, the rate at which powdered colorant may be expelled from the bottom opening 210 can be adjusted.

Figure 3:
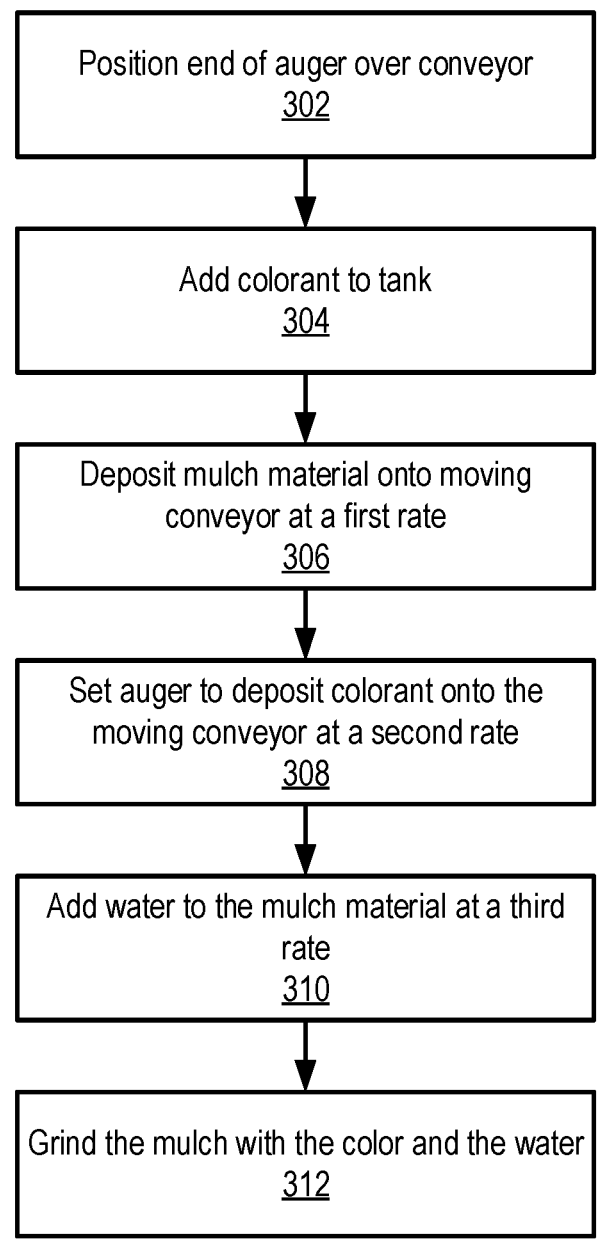
FIG. 3 is a block/flow diagram of a method for using powdered colorant to color a mulch material, in accordance with an embodiment of the present invention.

Referring now to FIG. 3, a method for coloring mulch is shown. At block 302, the end of the auger 108 is positioned over a conveyor 114 that will transport mulch material 112. In particular, the bottom opening 210 may be positioned over the conveyor 114. At block 304, powdered colorant 110 may be added to the tank 102. While colorant 110 may be added to the tank 102 before positioning the auger 108, the weight of the full tank may make it difficult to position the auger 108.

Block 306 deposits mulch material 112 onto the conveyor 114 at a first rate, where the conveyor 114 may be in motion, transporting the mulch material 112 from a source to a grinder. The first rate may be selected in accordance with a rate at which the mulch material 112 can be supplied and a rate at which the mulch material 112 can be processed in the grinder.

Block 308 sets the auger 108 to deposit powdered colorant 110 onto the moving conveyor 114 at a second rate, for example by setting a speed of the motor 106. The second rate may be selected according to the first rate and to a predetermined ratio of colorant to mulch material to ensure that the correct amount of colorant is consistently and evenly added.

Block 310 adds water 120 to the mulch material 112 at a third rate. The third rate may be selected according to the first rate and to a predetermined ratio of water to mulch material 112, to ensure that the mulch material has the correct degree of moisture. Table 1 describes some exemplary rates for the mulch material 112, colorant 110, and water 120.

| Wood (yards per hour) | Dry colorant (lbs per hour) | Water (gallons per hour) |
| --- | --- | --- |
| 100 | 300 | 100-500 |
| 200 | 600 | 200-1000 |
| 300 | 900 | 300-1500 |
| 400 | 1200 | 400-2000 |
| 600 | 1800 | 600-3000 |

Block 312 grinds the mulch material 112, together with the powdered colorant 110 and the water 120, to produce a colored mulch product. The grinder may be set to produce a mulch output that has any appropriate granularity, and may keep material within it for any appropriate amount of time to ensure that the colorant 110 is evenly mixed with the mulch.

Figure 4:
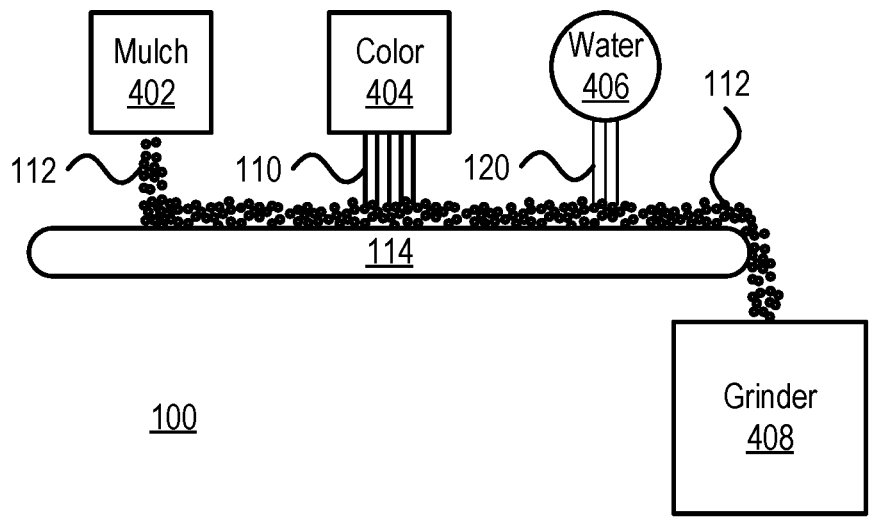
FIG. 4 is a diagram of a process for coloring mulch, including inputs and outputs of a conveyor, in accordance with an embodiment of the present invention.

Referring now to FIG. 4, a side view of the system 100 is shown, with a focus on the progression of the mulch material 112. The mulch material 112 is deposited on the conveyor 114 from mulch source 402, and may include any appropriate organic or inorganic mulch material, with pieces at any appropriate size. As the top surface of the conveyor 114 moves from left to right within the perspective of FIG. 4, color is added at point 404, for example by the auger 108, described above. Optionally, water 120 may also be added at point 406.

Notably, the order of these steps may be altered, as appropriate. For example, the addition of color at point 404 and the addition of water at point 406 may be reversed. Other materials may be added as well. For example, mulch material 112 may be added at multiple mulch points 402. Similarly, multiple colorants 110 may be added at different color points 404. Any other appropriate additives may be included as well, whether added at a separate point, or mixed with one of the illustrated points.

At the end of the conveyor 114, the combination of mulch material 112 and additives is deposited into a grinder 408. The grinder 408 grinds the mulch material 112 to a predetermined granularity, evenly mixed with water 120 and powdered colorant 110, as well as any other additives. The grinder 408 outputs the colored mulch, for example into a hopper or a separate conveyor, to be stored or used.

Figure 5:
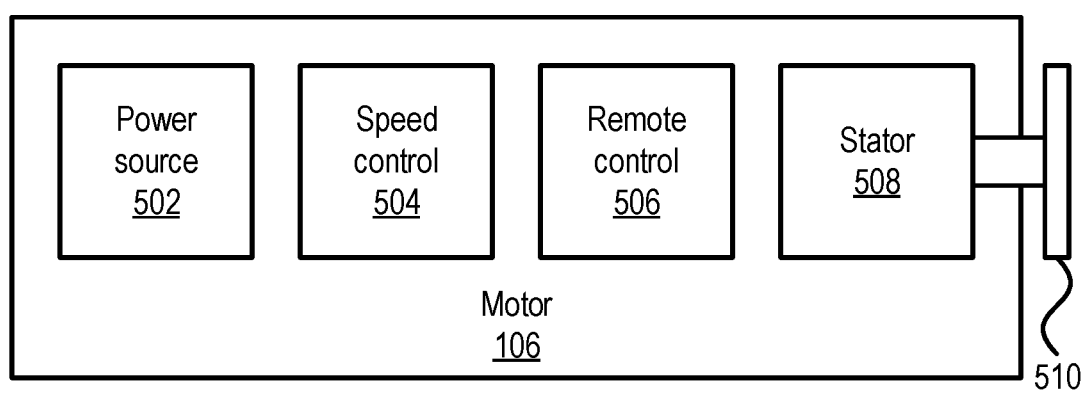
FIG. 5 is a block diagram of a motor that may be used to operate an augur, in accordance with an embodiment of the present invention.

Referring now to FIG. 5, additional detail on the motor 106 is shown. While it is specifically contemplated that the motor 106 may be an electric motor, it should be understood that the role of the motor 106 may be performed by any appropriate source of power, including, for example, an internal combustion engine, a windmill, or a waterwheel. The motor 106 turns a rotor 510, which turns the shaft 206 of the rotor 108 using a belt 212, as described above.

The motor 106 may include several functional components. A power source 502 provides, e.g., electrical power. The power source 502 may include any source of electrical power, such as a connection to the electrical grid, a battery, a gas-powered generator, or solar or wind power. The power source 502 is used to power the stator 508 and rotor 510, causing the rotor 510 to turn.

The operation of the motor 106 can be controlled, for example using speed control 504 and remote control 506. The speed control 504 determines a speed of rotation for the rotor 510, and thus controls the speed at which powdered colorant 110 is added. The remote control 506 may include a wired or wireless control, for example including a radio transceiver, that receives instructions. Such instructions may include, for example, instructions to set the speed via the speed control 504 and instructions to cut off power via the power source 502. The remote control 506 thereby provides an operator with the ability to turn the motor 106 on and off from a remote location.

The remote control 506 may include a radio receiver that operates at UHF frequencies, for example between about 300 MHZ and about 3 GHz. The remote control 506 may further include a selector switch that may control the mode of operation of the motor 106 (e.g., off, forward, backward) and the speed of the motor 106. The instructions may be encoded in a radio transmission according to any appropriate encoding scheme.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method for coloring mulch, comprising:
transporting mulch material to a grinder using a conveyor;
adding powdered colorant to the mulch material, on the conveyor, at a temperature below the freezing point of water, using an auger;
grinding the mulch material and the powdered colorant together in the grinder to produce a colored mulch.

2. The method of claim 1, wherein the auger includes a shaft with a solid core.

3. The method of claim 1, transporting the mulch material is performed at a first rate, adding the powdered colorant is performed at a second rate, and a ratio of the first rate to the second rate is set to provide a predetermined ratio of the colorant to the material in the grinder.

4. The method of claim 3, wherein adding the powdered colorant at the second rate includes setting a speed of the auger, and wherein transporting the mulch material at the first rate includes setting a speed of the conveyor.

5. The method of claim 1, further comprising adding water to the mulch material on the conveyor.

* * * * *